C. P. BYRNES.
METHOD OF FORMING GLASS VACUUM RECEPTACLES.
APPLICATION FILED MAY 12, 1908.
1,127,381. Patented Feb. 2, 1915.
2 SHEETS—SHEET 1.
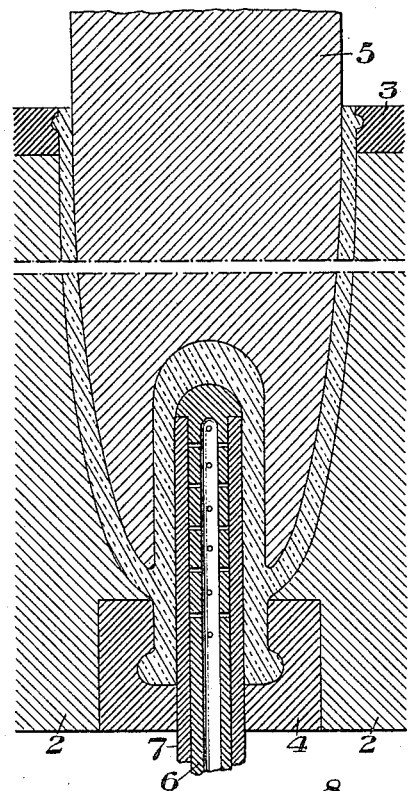
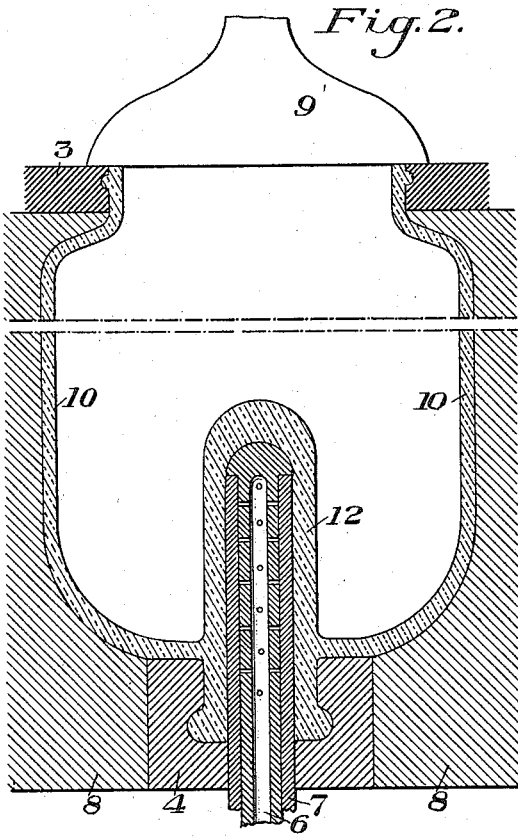
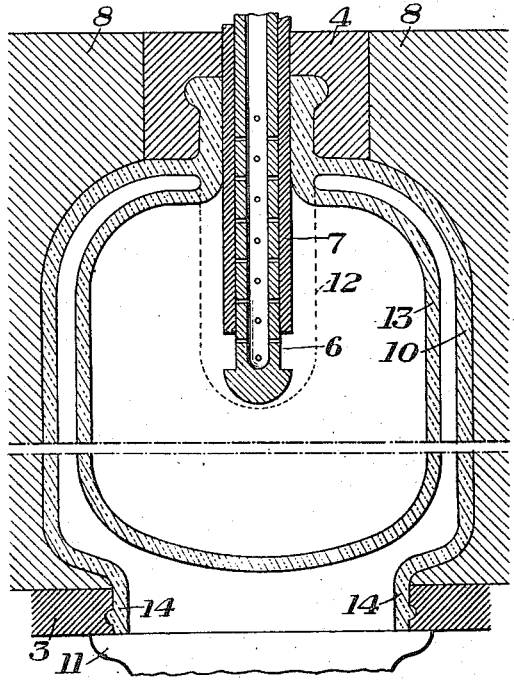
WITNESSES
R. A. Balderson
Geo. H. Parmelee
INVENTOR
C. P. Byrnes C. P. BYRNES.
METHOD OF FORMING GLASS VACUUM RECEPTACLES.
APPLICATION FILED MAY 12, 1908.
1,127,381.
Patented Feb. 2, 1915.
2 SHEETS—SHEET 2.
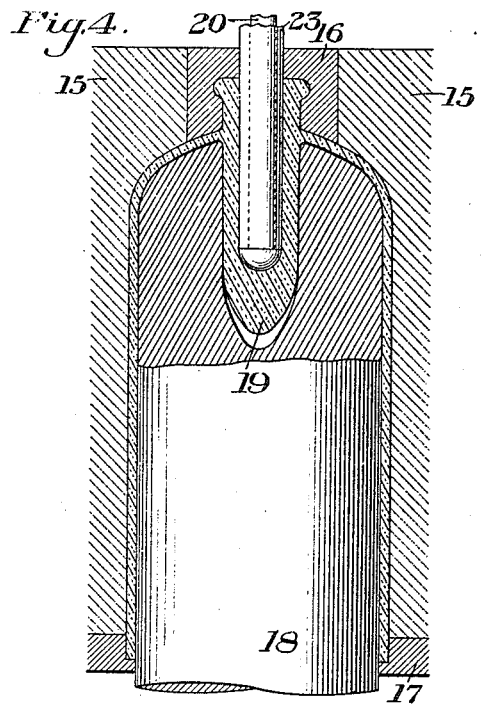
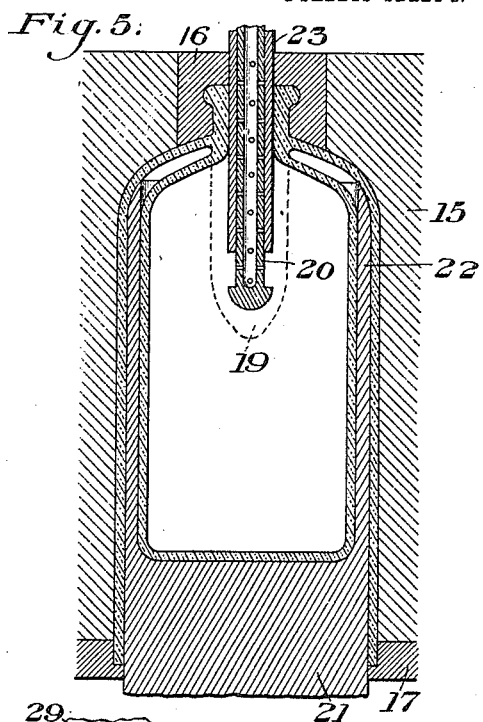
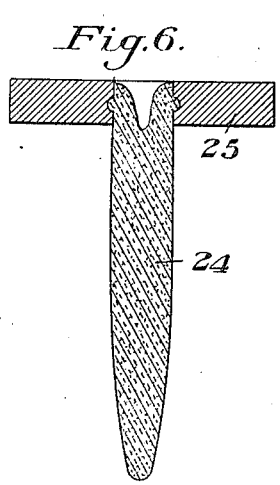
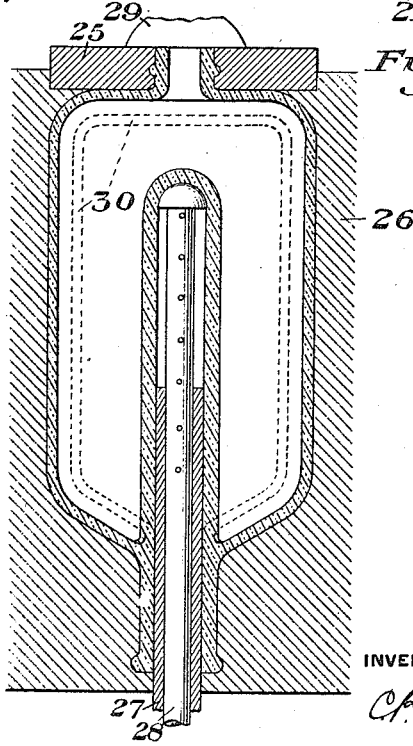
WITNESSES
INVENTOR

UNITED STATES PATENT OFFICE.

CLARENCE P. BYRNES, OF SEWICKLEY, PENNSYLVANIA.

METHOD OF FORMING GLASS VACUUM-RECEPTACLES.

1,127,381.     Specification of Letters Patent.     Patented Feb. 2, 1915.

Application filed May 12, 1908. Serial No. 432,372.

*To all whom it may concern:*

Be it known that I, CLARENCE P. BYRNES, of Sewickley, Allegheny county, Pennsylvania, have invented new and useful Methods of Forming Glass Vacuum-Receptacles, of which the following is a full, clear, and exact description, reference being had to the accompanying drawings, forming part of this specification, in which—

Figures 1, 2 and 3 are vertical sectional views showing successive operations in forming a vacuum glass bottle; Figs. 4 and 5 are similar views showing a modified method; and Figs. 6 and 7 show the successive steps of a further method of forming bottles.

My invention relates to vacuum vessels or articles, and is designed to provide a method whereby the same may be cheaply and rapidly made.

In the drawings, referring to the forms of Figs. 1 to 3, inclusive, I show a method of pressing and blowing a vacuum bottle. In Fig. 1, 2 represents a portion of a press mold, having a top mold ring 3 and a bottom mold ring 4. 5 is the pressing plunger moving through the mold ring 3, and 6 and 7 represent the portions of the two-part plunger moving through the mold ring 4. The part 6 is a supply pipe having an enlarged head against which the sleeve 7 fits when the parts are in the position of Fig. 1. After the pressing operation, as shown in Fig. 1, the pressing mold is opened and the two-part blow mold 8 of Fig. 2 is brought into operative position relative to the mold rings and a blow-head 9 is brought into position on mold ring 3 to expand the outer wall 10 into bottle form. The mold and rings may then be reversed into the position shown in Fig. 3, and a closure or air supply cap 11, may be applied to the mold ring 3, which is now at the lower end. The sleeve 7 is then drawn back to allow air under pressure to enter the inner blank portion 12, which is thus expanded to form the inner wall or bottle portion 13. The mold parts and rings may then be removed, and the portions 14 may then be closed in to close the bottom of the outer jacket portion in any desirable way. The vacuum may then be formed between the two walls 10 and 13 in the ordinary manner.

In expanding the inner vessel 13, suitable air pressure may be retained or supplied within the outer wall 10 by means of the lower closure or supply cap 11, which will form a cushion against which the inner wall is expanded. This cushion will be equalized in pressure so that by varying the pressure the inner wall may be brought into the desired proximity to the outer wall. Instead of blowing and expanding both the inner and outer walls, I may press the outer wall and then expand the inner blank within it. Thus, in Fig. 4, I show a press mold 15, having mold rings 16 and 17, of which the ring 16 forms the mouth and neck of the bottle. In this case, the pressing plunger 18 is provided with a hole in its end to form the inner blank 19, around the two-part blow-plunger 20. This operation may be carried out either with the parts as shown, or in the reverse position, that is, with the mold ring 17 uppermost. The two-part plunger 20 may be moved in during the pressing operation, or before it. The plunger 18 may then be withdrawn, and another plunger 21 inserted as shown in Fig. 5, this plunger having a cavity or a shape corresponding to the desired shape for the inner receptacle formed within the annular wall portion 22 thereof. The sleeve 23 of the two-part blow plunger may then be drawn back and air pressure allowed to enter to expand and shape the inner bottle wall. The plunger 21 may then be withdrawn and the mold and rings removed, when the lower portion of the outer wall may then be reheated and closed in by hand operation; or by reheating and pressing into a suitably shaped mold, to close its bottom. Instead of using the two plungers 18 and 21, the plunger 18 may consist of two parts, namely, an outer sleeve and an inner plunger having the shaping cavity of the blank 19. In this case, the inner portion would be drawn out, leaving the outer portion to form the mold wall against which the inner blank is then expanded, thus performing the function of the walls 22 of the second plunger 21. In this case, another central-forming plunger, may be inserted to take the place of the withdrawn plunger, and shape the bottom of the inner bottle portion, if desired.

In Figs. 6 and 7, I show another method in which the blank 24 is pressed in the ordinary manner in a press mold having a mold ring 25. This blank is then assembled with a blow mold, shown at 26 in Fig. 7, this blow mold having a lower portion shaped to give the desired shape to the neck and mouth of the bottle and having projecting therethrough the two-part blow plunger with the outer sleeve 27 and the inner supply tube 28. A blow-head 29 is applied to the mold ring 25, and the glass is thus expanded into the outer wall, mouth and neck. The two-part plunger in closed position is then forced up to form the central blank, and the sleeve portion 27 is then drawn down to allow air under pressure to blow out the inner blank to form the inner bottle wall, as shown in dotted lines at 30. In this case, the desired air pressure may be retained or supplied through head 29 to form the air cushion against which the inner blank is blown out. The plunger may then be withdrawn, the mold parts removed, and the small bottom neck portion of the outer jacket then re-shaped, and the vacuum formed in the ordinary manner.

In any of the cases, the bottom of the outer wall may be completely closed and sealed in forming the vacuum, or the glass may be formed around a valve through which the vacuum may be formed and held by said valve. This valve casing may be sealed within the glass bottom either in the forming of the bottle, or by cement, screw connection or other desirable connection.

In the form of Figs. 6 and 7, the neck may require reshaping by hand, and in this case, the mouth and neck portions of the blank may be reheated and shaped by hand tools in the ordinary manner. Reheating may also be applied between any of the steps, as desired, and before closing in the bottom of the outer jacket. The usual air vents may be used where necessary or desirable in the pressing or blowing operations.

In all the cases shown, the two walls of the receptacle are integrally united at the neck, thus supporting the upper end of the inner receptacle; and to support the lower portion of this receptacle, suitable non-conducting disks or spacers may be inserted between the two glass bottoms, or one glass bottom may be formed with integral glass lugs or projections arranged to contact with the other bottom and to hold the inner receptacle in place. If glass projections are used, these will have slight conductivity on account of their small area, but non-conducting spacers or other material are preferable. The ends of the drawn articles may then be closed and sealed.

The advantages of the invention result from the cheap and rapid method of manufacture and from the improved articles. The silvering or providing a reflecting surface on the outer surface of the inner bottle may be carried out before closing the bottom of the outer jacket.

I claim:

1. The process of manufacturing hollow wall receptacles which consists in, first forming integrally the outer blank with an open end and the inner blank with a closed end, and then closing the open end of the outer blank.

2. The process of manufacturing hollow wall receptacles which consists in, first, forming integrally the outer blank with an open end and the inner blank with a closed end, then closing the open end of the outer blank, and then creating a vacuum between the walls of said blanks.

3. The process of manufacturing hollow wall receptacles which consists in, first, forming the outer blank with an open end and the inner blank with a closed end, both integral with a common neck, and then closing the open end of the outer blank.

4. The process of manufacturing hollow wall receptacles which consists in, first, forming the outer blank with an open end and the inner blank with a closed end, both integral with a common neck, then closing the open end of the outer blank, and then creating a vacuum between the walls of said blanks.

5. The process of manufacturing hollow wall receptacles which consists in, first, forming integrally the outer blank with an open end and the inner blank with a closed end, then blowing the inner blank to the desired contour, then closing the open end of the outer blank, and then creating a vacuum between the walls of said blanks.

6. The process of manufacturing hollow wall receptacles which consists in, first, forming the outer blank with an open end and the inner blank with a closed end, both integral with a common neck, then blowing the inner blank to the desired contour, and then closing the open end of the outer blank.

7. The process of manufacturing hollow wall receptacles which consists in, first, forming the outer blank with an open end and the inner blank with a closed end, both integral with a common neck, then blowing the inner blank to the desired contour, then closing the open end of the outer blank, and then creating a vacuum between the walls of said blanks.

8. In the process of manufacturing hollow wall receptacles, the steps consisting of forming integrally an outer blank with an open end and an inner blank with a closed end, expanding the inner blank, and then closing the open end of the outer blank.

9. In the process of manufacturing hollow wall glass receptacles, the steps consisting of first forming integrally an outer blank with an open end and the inner blank with a closed end, expanding one of said blanks and thereafter closing the open end of the outer blank.

10. In the process of manufacturing hollow wall receptacles, the steps consisting of forming an outer hollow blank open at one end, forcing a plunger through the central portion of the closed end of this outer blank to form an inner blank with its wall spaced apart from the wall of the outer blank, and thereafter closing the open end of the outer blank.

11. The method of making blanks for jacketed glass receptacles, consisting in blowing and expanding an outer hollow blank open at one end, forcing a plunger against the closed end of the blank, forming this portion into an interior receptacle spaced apart from the outer wall, and thereafter closing the open end of the outer blank.

12. The method of making blanks for jacketed glass receptacles, consisting in blowing and expanding a hollow blank open at one end, forcing a plunger against the closed end of the blank and thereby forming an interior receptacle with its wall spaced apart from the outer wall, simultaneously forming the mouth and neck of the receptacle at the end where the walls are integrally united, and thereafter closing the open end of the outer blank.

In testimony whereof, I have hereunto set my hand.

C. P. BYRNES.

Witnesses:
 GEO. B. BLEMING,
 R. D. LITTLE.